(12) United States Patent
Yang

(10) Patent No.: US 9,591,439 B2
(45) Date of Patent: Mar. 7, 2017

(54) METHOD AND DEVICE FOR TRANSMITTING LOCATION INFORMATION OF USER EQUIPMENT

(75) Inventor: Yi Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/233,728

(22) PCT Filed: Jun. 29, 2012

(86) PCT No.: PCT/CN2012/077814
§ 371 (c)(1),
(2), (4) Date: Jan. 17, 2014

(87) PCT Pub. No.: WO2013/010433
PCT Pub. Date: Jan. 24, 2013

(65) Prior Publication Data
US 2014/0155088 A1    Jun. 5, 2014

(30) Foreign Application Priority Data

Jul. 20, 2011 (CN) .......................... 2011 1 0203590

(51) Int. Cl.
*H04W 4/02* (2009.01)
*H04L 12/14* (2006.01)
(Continued)

(52) U.S. Cl.
CPC ............. *H04W 4/02* (2013.01); *G01S 5/0027* (2013.01); *H04L 12/1403* (2013.01);
(Continued)

(58) Field of Classification Search
CPC ... H04W 64/00; H04W 88/04; H04W 84/047; H04W 4/02; H04W 8/10
See application file for complete search history.

(56) References Cited

U.S. PATENT DOCUMENTS

2010/0260141 A1* 10/2010 Chowdhury et al. .......... 370/331
2010/0311419 A1* 12/2010 Bi ............................... 455/435.1
(Continued)

FOREIGN PATENT DOCUMENTS

| CN | 101287296 A | 10/2008 |
| CN | 101771989 A | 7/2010 |

(Continued)

OTHER PUBLICATIONS

Machine translation of CN102098723 A.*
(Continued)

*Primary Examiner* — Nam Huynh
(74) *Attorney, Agent, or Firm* — Blakely, Sokoloff, Taylor & Zafman LLP

(57) ABSTRACT

Disclosed is a method for transmitting location information about user equipment, used for determining the location of user equipment more accurately by the core network, benefitting operations such as accurate charging by the core network. The method includes: a control plane management device receiving location information reported by a relay node (RN), wherein the location information includes relevant information about the donor cell where the RN is located; and the control plane management device determining the location of UE according to the received location information, and sending the latest location information about the UE to a charging function node after the location of the UE has changed. Also disclosed is an implementing method for the charging function node side, and a device used for implementing these methods.

14 Claims, 4 Drawing Sheets

(51) Int. Cl.
  *G01S 5/00* (2006.01)
  *H04M 15/00* (2006.01)
  *H04W 64/00* (2009.01)
  *H04W 8/10* (2009.01)
(52) U.S. Cl.
  CPC .... *H04L 12/1485* (2013.01); *H04M 15/8033* (2013.01); *H04W 64/00* (2013.01); *H04W 8/10* (2013.01)

(56) References Cited

U.S. PATENT DOCUMENTS

2012/0276910 A1* 11/2012 Zhang ............... H04W 36/0005
                                                         455/439
2013/0329629 A1* 12/2013 Bao et al. ..................... 370/315
2013/0337813 A1* 12/2013 Van Phan ........... H04W 84/005
                                                         455/436

FOREIGN PATENT DOCUMENTS

| | | | |
|---|---|---|---|
| CN | 102098723 A * | 6/2011 | |
| CN | 102264027 A | 11/2011 | |
| EP | 1 206 153 A2 | 5/2002 | |
| EP | 1 237 389 A2 | 9/2002 | |
| EP | 1 307 064 A2 | 5/2003 | |
| WO | WO 03/032617 A1 | 4/2003 | |

OTHER PUBLICATIONS

European Patent Office Communication enclosing Extended European Search Report for Counterpart European Patent Application No. 12815144.6, 7 pages, (Nov. 21, 2014).
PCT International Search Report for PCT Counterpart Application No. PCT/CN2012/077814, 5 pgs. (including English translation), (Nov. 1, 2012).
PCT Written Opinion of the International Searching Authority for PCT Counterpart Application No. PCT/CN2012/077814, 20 pp. (including English translation), (Nov. 1, 2012).
PCT Notification Concerning Transmittal of International Preliminary Report on Patentability (Chapter I of the Patent Cooperation Treaty) for PCT Counterpart Application No. PCT/CN2012/077814, 23 pp. (including English translation), (Jan. 30, 2014).

* cited by examiner

METHOD AND DEVICE FOR TRANSMITTING LOCATION INFORMATION OF USER EQUIPMENT

CROSS-REFERENCE TO RELATED APPLICATIONS

The present application is a U.S. National Stage under 35 U.S.C. §371 of International Application No. PCT/CN2012/077814, filed on Jun. 29, 2012, entitled METHOD AND DEVICE FOR TRANSMITTING LOCATION INFORMATION ABOUT USER EQUIPMENT, designating the United States, and claiming priority to Chinese Patent Application No. 201110203590.4, filed with the Chinese Patent Office on Jul. 20, 2011 and entitled "Method and device for transmitting location information of user equipment", which was incorporated by reference in its entirety.

FIELD OF THE INVENTION

The present invention relates to the field of communications and particularly to a method and device for transmitting location information of a user equipment.

BACKGROUND OF THE INVENTION

For the purpose of legal interception, an emergent call, location-based charging, cell-level locating, etc., the location of a User Equipment (UE) needs to be obtained at the network side. In Attach, Tracking Area Update (TAU), Service Request, X2 (an interface) HO (handover), S1 (an interface) HO and other procedures defined in the existing standards, cell-level identifier information of the UE can be obtained by a core network. A location reporting procedure is also defined in the standard to obtain current precise cell information of the UE. The location reporting procedure can inquire instantly about the identifier of a cell to which the UE is currently connected and can also configure an eNB (evolved Node B) to notify an MME (Mobility Management Entity) of the identifier of the cell immediately each time the UE changes its serving cell. For example, the MME sends a location reporting condition to the eNB in a Location Reporting Control message. The eNB sends the cell identifier information of the UE to the MME in a Location Report message when the location reporting condition is satisfied.

If the MME supports a function of "location information change reporting", then a PGW (Packet Data Network Gateway) will be notified of this through an SGW (Serving Gateway). When the PGW knows the MME supporting the function of "location information change reporting", the PGW can request the MME to notify the PGW when there is a change in location information of the UE, to thereby achieve location-based charging.

In a Long Term Evolution-Advanced (LTE-A) system, a Relay Node (RN) has been introduced to extend network coverage. The RN is connected wirelessly to a Donor Evolved Node B (DeNB). The cell to which the RN is connected is called a donor cell, and a cell to which the UE is connected is called the serving cell for the concerned UE. In a high speed moving environment, the RN can be deployed e.g. in a railway, for the purpose of reducing the handover rates of the UEs, and improving a signal quality inside a train. In this case, the UE moves from a place A to a place B, but in the serving RN is not changed, that is, there is no change in serving cell of the UE. If serving cell information of the UE is reported as in the prior art, then the core network may assume from the service cell information that the UE has not moved significantly although the UE indeed has moved far away. Apparently, in the prior art, the UE may be inaccurately located just according to the severing cell information, thus affecting accurate charging for the UE.

SUMMARY OF THE INVENTION

Embodiments of the invention provide a method and device for transmitting location information of a user equipment so as to enable a core network to determine the location of the user equipment accurately and facilitate accurate charging and other goals.

A method for transmitting location information of a user equipment, applicable to a control plane management device side, including:

receiving, by a control plane management device, the location information reported from a Relay Node (RN), wherein the location information includes relevant information of a donor cell where the RN is connected; and determining, by the control plane management device, a location of the UE according to the received location information, and sending the latest location information of the UE to a charging function node when there is a change in location of the UE.

A method for transmitting location information of a user equipment, applicable to a charging function node side, including:

receiving, by the charging function node, the location information sent from a control plane management device, wherein the location information includes relevant information of a donor cell where an RN is connected; and determining, by the charging function node, a location of the UE according to the received location information.

A control plane management device, including:

a first interface module configured to receive location information reported from a Relay Node (RN), wherein the location information includes relevant information of a donor cell where the RN is connected; and a second interface module configured to determine a location of a UE according to the received location information, and to send the latest location information of the UE to a charging function node when there is a change in location of the UE.

A charging function node device, including:

an interface module configured to receive location information sent from a control plane management device, wherein the location information includes relevant information of a donor cell where an RN is connected; and a control module configured to determine a location of a UE according to the received location information.

In the embodiments of the invention, a control plane management device reports relevant information of a donor cell where an RN is connected to a charging function node, and the charging function node can determine the location of a UE according to the relevant information of the donor cell. Thus the location of the UE can be determined accurately in the environment that the RN is moving but the UE is almost stationary relative to the RN, thereby facilitating accurate charging and other operations on the UE.

DETAILED DESCRIPTION OF THE EMBODIMENTS

In an embodiment of the invention, a control plane management device reports relevant information of a donor cell where an RN is connected to a charging function node, and the charging function node can determine the location of a UE according to the relevant information of the donor cell. Thus the location of the UE can be determined accurately in the event that the RN moves and the UE is substantially stationary relative to the RN, thereby facilitating accurate charging and other operations on the UE.

Figure 1:
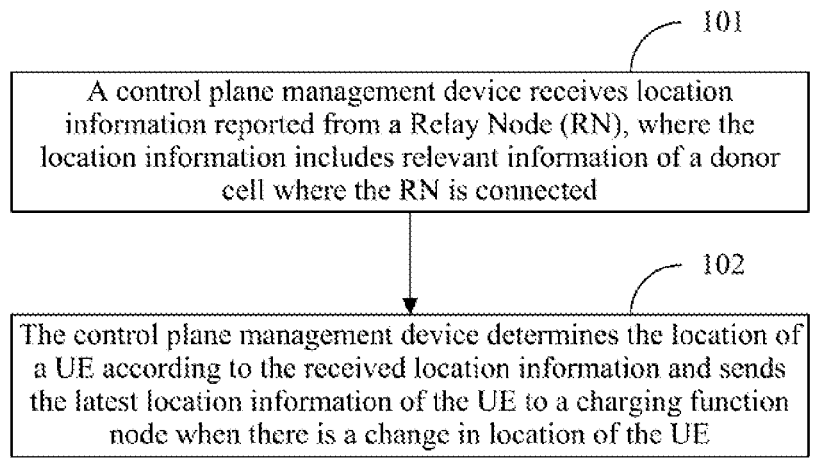
FIG. 1 is a flow chart of a method for transmitting location information of a user equipment at the control plane management device side in an embodiment of the invention.

Referring to FIG. 1, a flow of a method for transmitting location information of a user equipment at the control plane management device side in this embodiment is as follows.

Step 101: The control plane management device receives location information reported from a Relay Node (RN), where the location information includes relevant information of a donor cell where the RN is connected.

Step 102: The control plane management device determines the location of a UE according to the received location information and sends latest location information of the UE to a charging function node when there is a change in location of the UE.

Figure 2:
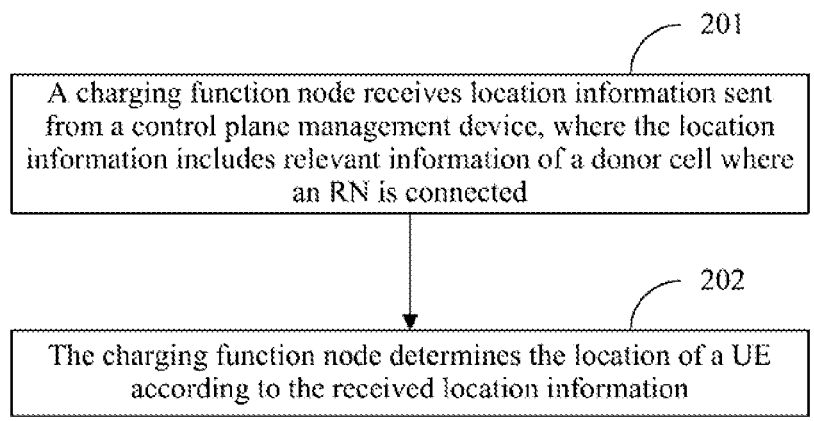
FIG. 2 is a flow chart of a method for transmitting location information of a user equipment at the charging function node side in an embodiment of the invention.

As opposed to the control plane management device, referring to FIG. 2, a flow of a method for transmitting location information of a user equipment at the charging function node side in this embodiment is as follows.

Step 201: The charging function node receives location information sent from a control plane management device, where the location information includes relevant information of a donor cell where an RN is connected.

Step 202: The charging function node determines the location of a UE according to the received location information.

In this embodiment, the relevant information of the donor cell includes at least one of the following information: an EUTRAN (Evolved Universal Terrestrial Radio Access Network) Cell Global Identifier (ECGI) corresponding to the donor cell, a Tracking Area Identifier (TAI) corresponding to the donor cell, a global eNB identifier of a DeNB corresponding to the donor cell, an eNB name of the DeNB corresponding to the donor cell, geographical location information of the RN and geographical location information of the DeNB corresponding to the donor cell.

The location information may further include relevant information of a serving cell of the UE. The relevant information of the serving cell includes an ECGI corresponding to the serving cell and a TAI corresponding to the serving cell.

In this embodiment, the location information is sent to the charging function node so that the charging function node can perform location-based charging accurately according to the location information. A premise is that the charging function node needs to perform location-based charging, so preferably, the control plane management device sends the location information to the charging function node after the charging function node activates a location information reporting function of the control plane management device.

Figure 3:
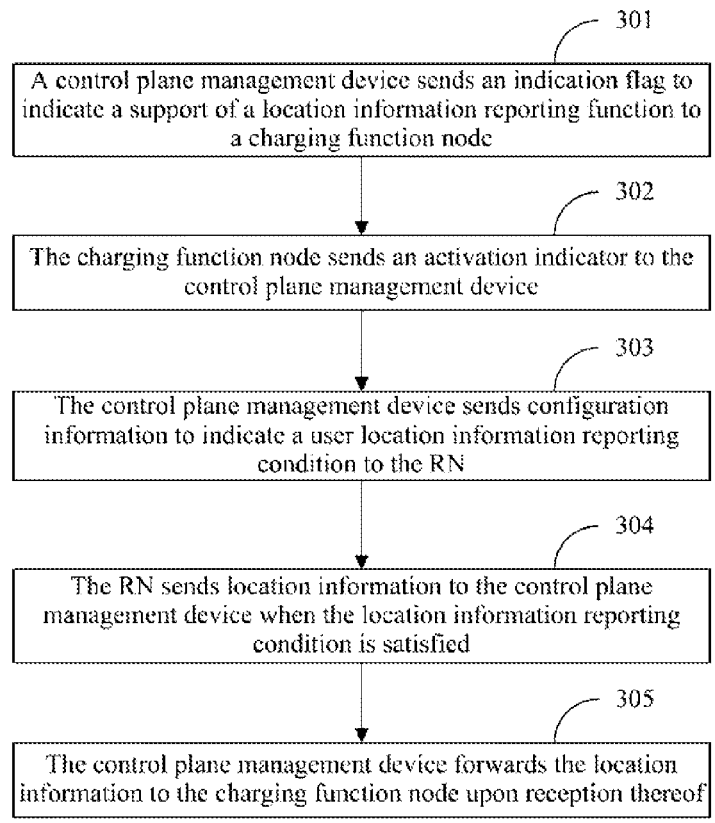
FIG. 3 is a flow chart of details of a method for transmitting location information of a user equipment in an embodiment of the invention.

A detailed implementation process is as follows with reference to FIG. 3.

Step 301. A control plane management device sends an indication flag to indicate a support of a location information reporting function to a charging function node.

The control plane management device sends the indication flag to indicate a support of the location information reporting function to the charging function node in a Create Session Request message. Alternatively, the control plane management device sends the indication flag to indicate a support of the location information reporting function to the charging function node in a Modify Bearer Request message. Correspondingly, the charging function node receives the indication flag to indicate a support of the location information reporting function in the Create Session Request message sent from the control plane management device. Alternatively, the charging function node receives the indication flag to indicate a support of the location information reporting function in the Modify Bearer Request message sent from the control plane management device.

The indication flag to indicate a support of the location information reporting function is an additional location information reporting indication flag to indicate a support of a donor cell location information reporting function or a location information change reporting indication flag to indicate a support of a serving cell location information reporting function, where the additional location information reporting indication flag is a newly defined flag indicating a support of the donor cell location information reporting function in this embodiment; and the location information change reporting indication flag is a flag existing in the prior art and indicating reporting of relevant information of the serving cell of the UE, and the existing location information change reporting indication flag is reused in this embodiment so that reporting of the location information change reporting indication flag indicates a support of donor cell location information reporting. If the control plane management device which does not support the donor cell location information reporting function sends the location information change reporting indication flag which is activated, then simply no relevant information of the donor cell will be reported in a subsequent process.

Step 302. The charging function node sends an activation indicator to the control plane management device. The charging function node determines the location information reporting function of the control plane management device to be activated, particularly the additional location information (that is, relevant information of the donor cell) reporting function, upon determining location-based changing to be needed.

The charging function node sends the activation indicator to the control plane management device in a Create Session Response message. Alternatively, the charging function node sends the activation indicator to the control plane management device in a Modify Bearer Response message.

Correspondingly, the control plane management device receives the activation indicator from the charging function node in the Create Session Response message. Alternatively, the control plane management device receives the activation indicator from the charging function node in the Modify Bearer Response message.

Step 303: The control plane management device sends configuration information to indicate a user location information reporting condition to the RN. The configuration information to indicate the user location information reporting condition includes at least one of the following conditions: immediately reporting; reporting when the RN is handed over to a new donor cell or donor eNB; and reporting when a User Equipment (UE) is handed over between different cells.

The control plane management device sends the configuration information to indicate the user location information reporting condition to the RN in a Location Reporting Control message; or The control plane management device sends the configuration information to indicate the user location information reporting condition to the RN in an S1 Application layer (S1AP) message dedicated to transmission of the configuration information.

Step 304: The RN sends location information to the control plane management device when the location information reporting condition is satisfied.

The RN can send cell-related information indicating the user location information to the control plane management device in numerous particular implementations or in numerous scenarios. For example, the RN sends the location information to the control plane management device in a Location Report message. Alternatively, the RN sends the location information to the control plane management device in an S1AP message dedicated to reporting of the user location information. Alternatively, the RN sends the location information to the control plane management device in an Uplink Non-Access Stratum (NAS) Transport message when the UE performs an NAS procedure in a connected status. Alternatively, the RN sends the location information to the control plane management device in a Path Switch Request message after the UE is handed over to the RN from another base station via an X2 interface. Alternatively, the RN sends the location information to the control plane management device in a Handover Notify message after the UE is handed over to the RN from another base station via an S1 interface.

Step 305: The control plane management device forwards the location information to the charging function node upon reception thereof. Preferably, the control plane management device forwards the latest location information to the charging function node upon determining a change in location information of the UE.

The control plane management device sends the location information of the UE to the charging function node in a Change Notification Request message or sends the location information of the UE to the charging function node in another newly defined message.

Figure 4:
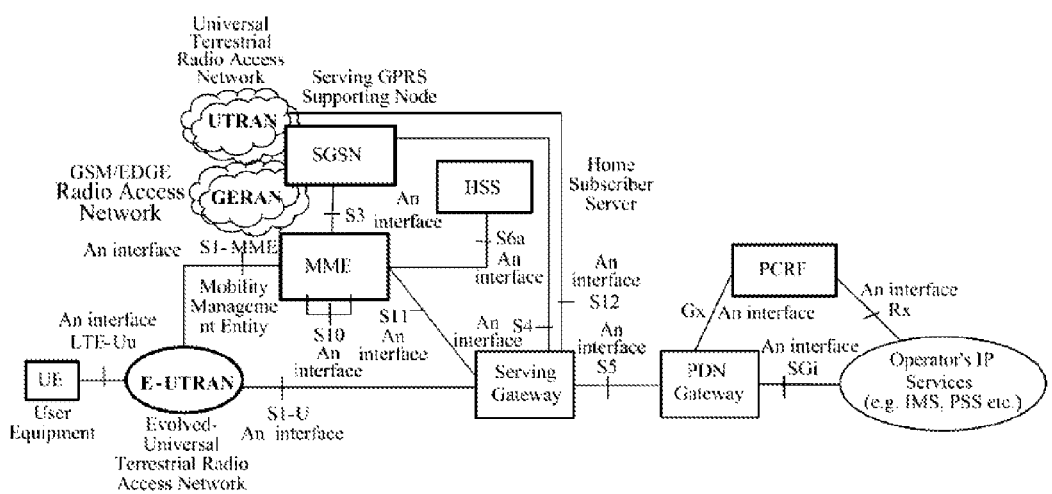
FIG. 4 is a structural diagram of a system in an embodiment of the invention.

In this embodiment, the control plane management device may be an MME in an EPS (Evolved Packet System) or an SGSN (Serving GPRS Supporting Node) in a 3G (third-generation) system. The charging function node includes an SGW (Serving Gateway) or a PGW (Packet Data Network Gateway). Reference is made to FIG. 4 illustrating the structure of a system including the EPS and the 3G system.

The EPS system will be described below as an example.

Figure 5:
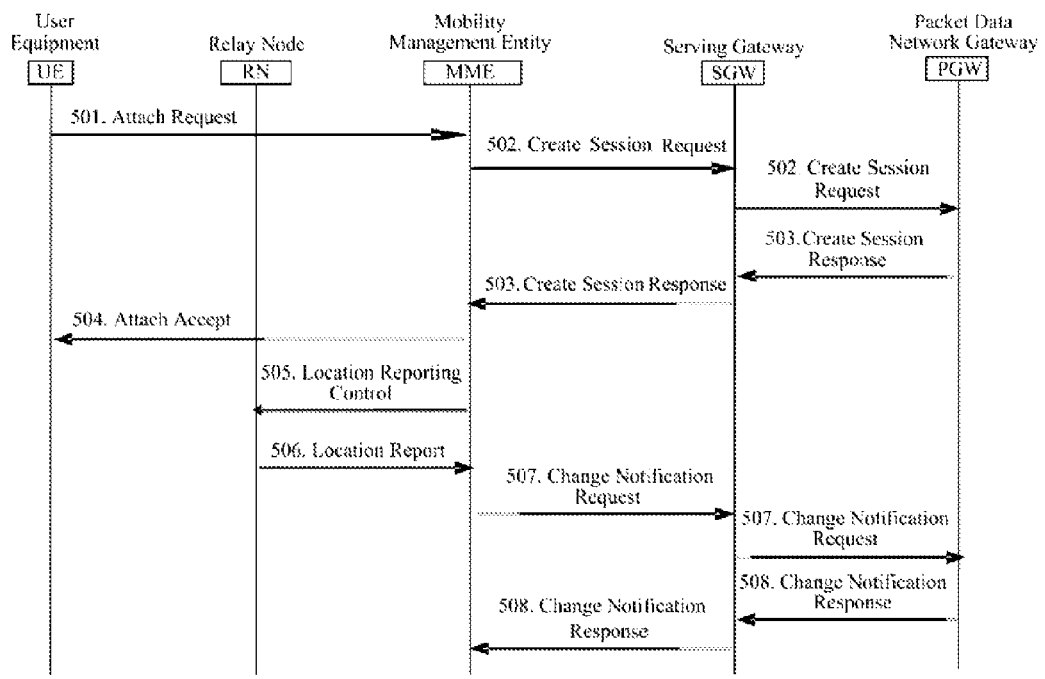
FIG. 5 is a flow chart of a method for transmitting location information in an EPS system in an embodiment of the invention.

Referring to FIG. 5, a flow of a method for transmitting location information in an EPS system in this embodiment is as follows.

Step 501: A UE sends an Attach Request message to an MME through an RN.

Step 502: The MME sends a Create Session Request message carrying an additional location information reporting indication flag to the PGW through an SGW. The MME may notify the PGW only once upon determining that the UE is connected to the RN or may notify for each UE the PGW of whether the MME supports the additional location information reporting function.

Step 503: The PGW sends a Create Session Response message carrying an activation indicator to the MME through the SGW.

Step 504: The MME sends an Attach Accept message to the UE through the RN.

Step 505: The MME sends a Location Reporting Control message carrying configuration information to the RN. This step may be performed in synchronization with the step 504.

Step 506: The RN sends a Location Report message carrying location information to the MME, particularly carrying relevant information of a donor cell and may further carrying relevant information of a serving cell of the UE.

Step 507: The MME sends a Change Notification Request message carrying the location information to the PGW through the SGW.

Step 508: The PGW sends a Change Notification Response message to the MME through the SGW.

The PGW may further perform location-based charging and other operations according to the received location information. If dynamic PCC (Policy and Charging Control) is deployed, then the PGW may further send the received location information of the UE to a PCRF (Policy and Charging Rules Function) entity.

The MME of the UE may need to know that a serving eNB of the UE is the RN before sending the Location Reporting Control message to the RN or before sending an indicator indicating a support of the "additional location information reporting" function to the SGW/PGW. This can be known as follows: (a) the RN indicates itself to be of an RN type in an S1 Setup Request message when setting up an S1 interface with the MME; and (b) the RN indicates itself to be of an RN type in an uplink S1AP message after the UE accesses the RN (including the UE initially accessing the RN, the UE being handed over to the RN, etc.).

In this embodiment, the control plane management device can notify the PGW that the control plane management device supports the location information reporting function when the UE accesses or is handed over to the local site. In order to save a signalling overhead, when the UE is handed over to the local site, the destination control plane management device may receive the indicator indicating whether to support the location information reporting function sent from the source control plane management device, and if the function of the source control plane management device is not consistent with the destination control plane management device, then the destination control plane management device supporting the location information reporting function notifies the PGW that the destination control plane management device supports the location information reporting function. If the function of the source control plane management device is consistent with the destination control plane management device, then it is not necessary to send any indication flag to indicate a support of the location information reporting function to the charging function node. A detailed description thereof will be given below in an embodiment.

Figure 6:
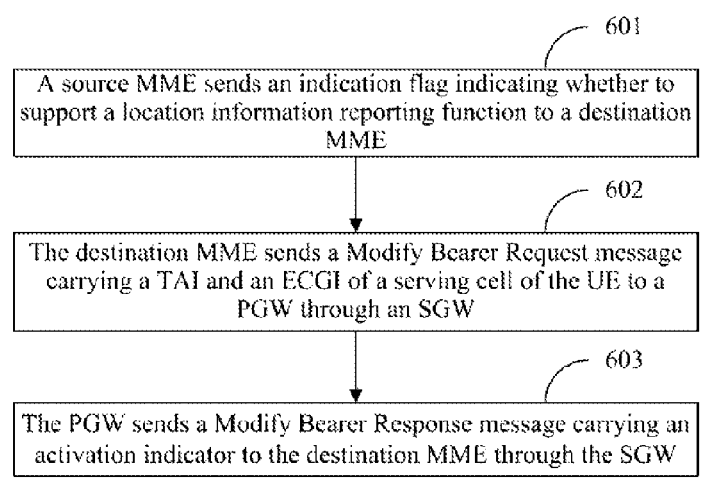
FIG. 6 is a flow chart of a method for transmitting location information in a handover procedure in an embodiment of the invention.

Referring to FIG. 6, a flow of a method for transmitting location information in a handover procedure in this embodiment is as follows.

Step 601: A source MME sends an indication flag indicating whether to support a location information reporting function to a destination MME.

Particularly, when a UE performs an S1 handover, if the source MME supports an "additional location information reporting" function, then the source MME may indicate that the source MME supports the "additional location information reporting" function in a Forward Relocation Request message. Alternatively, the source MME may indicate that the source MME does not support the "additional location information reporting" function.

When TAU occurs for the UE, if the source MME supports the "additional location information reporting" function, then the source MME may indicate that the source MME supports the "additional location information reporting" function in a Context Response message. Alternatively, the source MME may indicate that the source MME does not support the "additional location information reporting" function.

Step 602: The destination MME sends a Modify Bearer Request message carrying a TAI and an ECGI of a serving cell of the UE to a PGW through an SGW. When the destination MME supporting the "additional location information reporting" function receives an indicator indicating no support of the "additional location information reporting" function sent from the source MME, the Modify Bearer Request message further includes an indicator indicating a support of the "additional location information reporting" function. When the destination MME supporting the "additional location information reporting" function receives an indicator indicating a support of the "additional location information reporting" function sent from the source MME, the Modify Bearer Request message may not include an indicator indicating a support of the "additional location information reporting" function.

Step 603: The PGW sends a Modify Bearer Response message carrying an activation indicator to the destination MME through the SGW. If the PGW decides no activation, then no activation indication will be carried.

Reference can be made to the steps 505-508 for a subsequent process.

An implementation process of transmitting location information has been appreciated from the foregoing description, and this process is generally performed by a control plane management device and a charging function node device. The internal structures and functions of the two devices will be introduced below.

Figure 7:
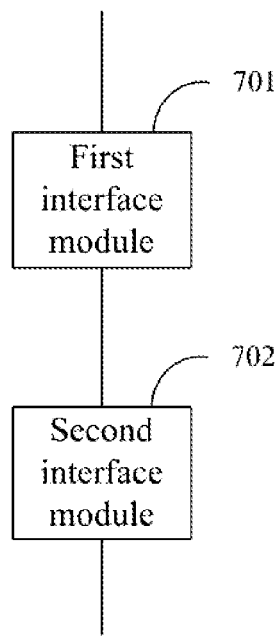
FIG. 7 is a structural diagram of a control plane management device in an embodiment of the invention.

Referring to FIG. 7, a control plane management device in this embodiment includes a first interface module 701 and a second interface module 702.

The first interface module 701 is configured to be connected with a Relay Node (RN) and to receive and send various messages, particularly receive location information reported from the Relay Node (RN), where the location information includes relevant information of a donor cell where the RN is connected.

The second interface module 702 is configured to be connected with a charging function node, to receive and send various messages, particularly determine the location of a UE according to the received location information, and to send the latest location information of the UE to the charging function node when there is a change in location of the UE.

The control plane management device further includes a control module configured to generate and parse the various messages.

In this embodiment, the relevant information of the donor cell includes at least one of the following information: an EUTRAN (Evolved Universal Terrestrial Radio Access Network) Cell Global Identifier (ECGI) corresponding to the donor cell, a Tracking Area Identifier (TAI) corresponding to the donor cell, a global eNB identifier of a DeNB corresponding to the donor cell, an eNB name of the DeNB corresponding to the donor cell, geographical location information of the RN and geographical location information of the DeNB corresponding to the donor cell. The location information may further include relevant information of a serving cell of the UE.

The first interface module 701 is further configured to send configuration information to indicate a user location information reporting condition to the RN. The configuration information to indicate the user location information reporting condition includes at least one of the following conditions: immediately reporting; reporting when the RN is handed over to a new donor cell or donor eNB; and reporting when the User Equipment (UE) is handed over between different cells. Particularly, the first interface module sends the configuration information to indicate the user location information reporting condition to the RN in a Location Reporting Control message; or sends the configuration information to indicate the user location information reporting condition to the RN in an S1 Application layer (S1AP) message dedicated to transmission of the configuration information.

The second interface module 702 is further configured to send an indication flag to indicate a support of a location information reporting function to the charging function node and to receive an activation indicator from the charging function node. The indication flag to indicate a support of the location information reporting function is an additional location information reporting indication flag to indicate a support of a donor cell location information reporting function or a location information change reporting indication flag to indicate a support of a serving cell location information reporting function.

The second interface module 702 sends the indication flag to indicate a support of the location information reporting function to the charging function node upon reception of an indication flag indicating no support of the donor cell location information reporting function sent from another control plane management device. The second interface module 702 is further configured to send no indication flag to indicate a support of the location information reporting function to the charging function node upon reception of an indication flag indicating a support of the donor cell location information reporting function sent from the another control plane management device.

Particularly, the second interface module 702 sends the indication flag to indicate a support of the location information reporting function to the charging function node in a Create Session Request message and receives the activation indicator from the charging function node in a Create Session Response message. Alternatively, the second interface module 702 sends the indication flag to indicate a support of the location information reporting function to the charging function node in a Modify Bearer Request message and receives the activation indicator from the charging function node in a Modify Bearer Response message.

Figure 8:
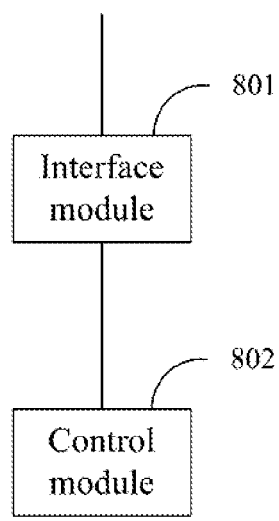
FIG. 8 is a structural diagram of a charging function node device in an embodiment of the invention.

Referring to FIG. 8, a charging function node device in this embodiment includes an interface module 801 and a control module 802.

The interface module 801 is configured to receive location information sent from a control plane management device, where the location information includes relevant information of a donor cell where an RN is connected.

The control module 802 is configured to determine the location of a UE according to the received location information.

In this embodiment, the relevant information of the donor cell includes at least one of the following information: an EUTRAN (Evolved Universal Terrestrial Radio Access Network) Cell Global Identifier (ECGI) corresponding to the donor cell, a Tracking Area Identifier (TAI) corresponding to the donor cell, a global eNB identifier of a DeNB corresponding to the donor cell, an eNB name of the DeNB corresponding to the donor cell, geographical location information of the RN and geographical location information of the DeNB corresponding to the donor cell. The location information may further include relevant information of a serving cell of the UE.

The interface module 801 is further configured to receive an indication flag to indicate a support of a location information reporting function sent from the control plane management device and to send an activation indicator to the control plane management device. The indication flag to indicate a support of the location information reporting function is an additional location information reporting indication flag to indicate a support of a donor cell location information reporting function or a location information change reporting indication flag to indicate a support of a serving cell location information reporting function. Particularly, the interface module 801 receives the indication flag to indicate a support of the location information reporting function sent from the control plane management device in a Create Session Request message and sends an activation indicator to the control plane management device in a Create Session Response message. Alternatively, the interface module 801 receives the indication flag to indicate a support of the location information reporting function sent from the control plane management device in a Modify Bearer Request message and sends an activation indicator to the control plane management device in a Modify Bearer Response message.

In the embodiments of the invention, a control plane management device reports relevant information of a donor cell where an RN is connected to a charging function node, and the charging function node can determine the location of a UE according to the relevant information of the donor cell. Thus the location of the UE can be determined accurately in the event that the RN moves and the UE is substantially stationary relative to the RN, thereby facilitating accurate charging and other operations on the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A method for transmitting location information of a User Equipment, UE, comprising:
   receiving, by a control plane management device of the UE, the location information reported by a Relay Node, RN, serving the UE, wherein the location information comprises relevant information of a donor cell where the RN is connected; and
   determining, by the control plane management device of the UE, a location of the UE according to the received location information, and sending the latest location information of the UE to a charging function node when there is a change in location of the UE;
   wherein before receiving, by the control plane management device of the UE, the location information reported from the RN, the method further comprises:
   sending, by the control plane management device of the UE, configuration information to indicate a user location information reporting condition to the RN;
   wherein before the control plane management device of the UE sends the configuration information to indicate the user location information reporting condition to the RN, the method further comprises: sending, by the control plane management device of the UE, an indication flag to indicate a support of a location information reporting function to the charging function node and receiving an activation indicator from the charging function node, wherein the indication flag to indicate a support of the location information reporting function is an additional location information reporting indication flag to indicate a support of a donor cell location information reporting function or a location information change reporting indication flag to indicate a support of a serving cell location information reporting function.

2. The method according to claim 1, wherein the relevant information of the donor cell comprises at least one of the following information:
an Evolved Universal Terrestrial Radio Access Network Cell Global Identifier, ECGI, corresponding to the donor cell, a Tracking Area Identifier, TAI, corresponding to the donor cell, a global eNode B identifier of a Donor eNode B, DeNB, corresponding to the donor cell, an eNode B name of the DeNB corresponding to the donor cell, geographical location information of the RN and geographical location information of the DeNB corresponding to the donor cell.

3. The method according to claim 1, wherein the configuration information to indicate the user location information reporting condition comprises at least one of the following conditions:
immediately reporting;
reporting when the RN is handed over to a new donor cell or donor eNB; and
reporting when the User Equipment, UE, is handed over between different cells.

4. The method according to claim 1, wherein sending, by the control plane management device of the UE, the indication flag to indicate a support of the location information reporting function to the charging function node comprises:
sending, by the control plane management device of the UE, the indication flag to indicate a support of the location information reporting function to the charging function node upon reception of an indication flag indicating no support of the donor cell location information reporting function sent from another control plane management device.

5. The method according to claim 4, further comprising:
sending, by the control plane management device of the UE, no indication flag to indicate a support of the location information reporting function to the charging function node upon reception of an indication flag indicating a support of the donor cell location information reporting function sent from the another control plane management device.

6. The method according to claim 1, wherein the location information further comprises relevant information of a serving cell of the UE.

7. A method for transmitting location information of a User Equipment, UE, comprising:
receiving, by a charging function node, the location information of the UE sent from a control plane management device of the UE, wherein the location information is reported by a Relay Node, RN, serving the UE to the control plane management device of the UE, and the location information comprises relevant information of a donor cell where an RN is connected; and
determining, by the charging function node, a location of the UE according to the received location information;
wherein before the charging function node receives the location information sent from the control plane management device of the UE, the method further comprises:

receiving, by the charging function node, an indication flag to indicate a support of a location information reporting function sent from the control plane management device of the UE and sending an activation indicator to the control plane management device of the UE, wherein the indication flag to indicate a support of the location information reporting function is an additional location information reporting indication flag to indicate a support of a donor cell location information reporting function or a location information change reporting indication flag to indicate a support of a serving cell location information reporting function.

8. The method according to claim 7, wherein the relevant information of the donor cell comprises at least one of the following information: an Evolved Universal Terrestrial Radio Access Network Cell Global Identifier, ECGI, corresponding to the donor cell, a Tracking Area Identifier, TAI, corresponding to the donor cell, a global eNode B identifier of a Donor eNode B, DeNB, corresponding to the donor cell, an eNode B name of the DeNB corresponding to the donor cell, geographical location information of the RN and geographical location information of the DeNB corresponding to the donor cell.

9. The method according to claim 7, wherein receiving, by the charging function node, the indication flag to indicate a support of the location information reporting function sent from the control plane management device of the UE comprises: receiving, by the charging function node, the indication flag to indicate a support of the location information reporting function sent from the control plane management device of the UE in a Create Session Request message; and
sending the activation indicator to the control plane management device of the UE comprises: sending, by the charging function node, the activation indicator to the control plane management device of the UE in a Create Session Response message; or
receiving, by the charging function node, the indication flag to indicate a support of the location information reporting function sent from the control plane management device of the UE comprises: receiving, by the charging function node, the indication flag to indicate a support of the location information reporting function sent from the control plane management device of the UE in a Modify Bearer Request message; and
sending the activation indicator to the control plane management device of the UE comprises: sending, by the charging function node, the activation indicator to the control plane management device of the UE in a Modify Bearer Response message.

10. The method according to claim 7, wherein the location information further comprises relevant information of a serving cell of the UE.

11. A control plane management device of a User Equipment (UE), comprising:
a first interface module configured to receive location information of a UE reported by a Relay Node, RN, serving the UE, wherein the location information comprises relevant information of a donor cell where the RN is connected; and
a second interface module configured to determine a location of the UE according to the received location information, and to send the latest location information of the UE to a charging function node when there is a change in location of the UE;

wherein the first interface module is further configured to send configuration information to indicate a user location information reporting condition to the RN;

wherein the second interface module is further configured to send an indication flag to indicate a support of a location information reporting function to the charging function node and to receive an activation indicator from the charging function node, wherein the indication flag to indicate a support of the location information reporting function is an additional location information reporting indication flag to indicate a support of a donor cell location information reporting function or a location information change reporting indication flag to indicate a support of a serving cell location information reporting function.

12. The control plane management device of the UE according to claim 11, wherein the second interface module sends the indication flag to indicate a support of the location information reporting function to the charging function node upon reception of an indication flag indicating no support of the donor cell location information reporting function sent from another control plane management device.

13. The control plane management device of the UE according to claim 12, wherein the second interface module is further configured to send no indication flag to indicate a support of the location information reporting function to the charging function node upon reception of an indication flag indicating a support of the donor cell location information reporting function sent from the another control plane management device.

14. The control plane management device of the UE according to claim 11, wherein the location information further comprises relevant information of a serving cell of the UE.

* * * * *